United States Patent
Kaneko et al.

(10) Patent No.: US 11,181,100 B2
(45) Date of Patent: Nov. 23, 2021

(54) ACTUATOR DEVICE, ACTUATOR BAND, AND METHOD FOR MANUFACTURING ACTUATOR BAND

(71) Applicant: Panasonic Intellectual Property Management Co., Ltd., Osaka (JP)

(72) Inventors: Yuriko Kaneko, Nara (JP); Maki Hiraoka, Ibaraki (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/931,036

(22) Filed: Jul. 16, 2020

(65) Prior Publication Data

US 2020/0347835 A1 Nov. 5, 2020

Related U.S. Application Data

(63) Continuation of application No. PCT/JP2019/008787, filed on Mar. 6, 2019.

(30) Foreign Application Priority Data

May 31, 2018 (JP) .............................. JP2018-104491
Feb. 14, 2019 (JP) .............................. JP2019-024169

(51) Int. Cl.
*F03G 7/06* (2006.01)

(52) U.S. Cl.
CPC .................................. *F03G 7/065* (2013.01)

(58) Field of Classification Search
CPC .. F03G 7/065; F03G 7/06; D02G 3/38; D03D 1/00; D03D 15/593; D04B 1/14;
(Continued)

(56) References Cited

U.S. PATENT DOCUMENTS 4,733,603 A 3/1988 Kukolj
10,480,492 B2 * 11/2019 Kaneko .................... F03G 7/06
(Continued)

FOREIGN PATENT DOCUMENTS

JP 62-272407 11/1987
JP 1-111183 U 7/1989
(Continued)

OTHER PUBLICATIONS

International Search Report of PCT application No. PCT/JP2019/008787 dated May 14, 2019.
(Continued)

*Primary Examiner* — Hoang M Nguyen
(74) *Attorney, Agent, or Firm* — McDermott Will & Emery LLP

(57) ABSTRACT

In order to stably operate an actuator device in repeated operations with suppression of an increase in a resistance value of a heating wire, the actuator band according to the present disclosure comprises a plurality of actuator wires and a plurality of heating wires. Each of the plurality of the actuator wires is formed of a fiber which consists of a polymer. The fiber is twisted along the long axis thereof and folded so as to have a cylindrical coil shape. Each of the plurality of the actuator wires is contracted by heat and restored by release of the heat. A braided fabric is formed with the plurality of the actuator wires arranged in a planer shape and the plurality of the heating wires. A first end of each of the plurality of heating wires is connected to a first end of each of the plurality of the actuator wires. A second end of each of the plurality of heating wires is connected to a second end of each of the plurality of the actuator wires.

11 Claims, 14 Drawing Sheets

(58) Field of Classification Search
CPC .......... D04B 1/22; D04B 21/00; D04B 21/20; D04C 1/02; D04C 1/06; H02N 10/00
USPC .............................. 60/527–529; 310/306–309
See application file for complete search history.

(56) References Cited

U.S. PATENT DOCUMENTS

| | | | |
|---|---|---|---|
| 2010/0164478 A1 | 7/2010 | Miura | |
| 2012/0100386 A1 | 4/2012 | Honma et al. | |
| 2015/0152852 A1* | 6/2015 | Li | D01F 6/00 60/528 |
| 2016/0177929 A1* | 6/2016 | Marion, III | F03G 7/065 337/395 |
| 2017/0029985 A1* | 2/2017 | Tajitsu | H04R 17/005 |
| 2017/0035550 A1 | 2/2017 | Hiraoka et al. | |
| 2017/0175719 A1* | 6/2017 | Asai | F03G 7/065 |
| 2019/0267538 A1 | 8/2019 | Yoshida et al. | |
| 2019/0376495 A1* | 12/2019 | Kaneko | F03G 7/06 |

FOREIGN PATENT DOCUMENTS

| | | |
|---|---|---|
| JP | 3-113258 | 5/1991 |
| JP | 11-286849 | 10/1999 |
| JP | 2007-016327 | 1/2007 |
| JP | 2007-212436 | 8/2007 |
| JP | 2008-079462 | 4/2008 |
| JP | 2009-301880 | 12/2009 |
| JP | 2012-087434 | 5/2012 |
| JP | 2015-204430 | 11/2015 |
| JP | 6111438 B | 4/2017 |
| JP | 2017-118811 | 6/2017 |
| JP | 2018-019500 | 2/2018 |
| WO | 2014/022667 | 2/2014 |
| WO | 2017/213108 | 12/2017 |

OTHER PUBLICATIONS

Maki Hiraoka et al., "Large strains and their polymer chain morphologies on coiled polymer fiber actuators", Symposium of the 24th Polymer material forum, disclosed on Nov. 26, 2015, by Maki Hiraoka et al., in Tokyo Japan, Published on Nov. 15, 2015.

Maki Hiraoka et al., "Power-efficient low-temperature woven coiled fibre actuator for wearable applications", Scientific Reports vol. 6, Article No. 36358, Nov. 4, 2016, and Supplementary information.

* cited by examiner

ACTUATOR DEVICE, ACTUATOR BAND, AND METHOD FOR MANUFACTURING ACTUATOR BAND

BACKGROUND

1. Technical Field

The present invention relates to an actuator device, an actuator band, and a method for manufacturing the actuator band.

2. Description of the Related Art

Patent Literature 1 discloses coiled and non-coiled twisted nanofiber yarn and polymer fiber torsional and tensile actuators. In Non-patent Literatures 1 and 2, Maki Hiraoka et al. disclose a coiled polymer fiber formed of linear low density polyethylene. According to Non-Patent Literatures 1 and 2, the coiled polymer fiber is contracted by heat and restored by release of the heat. Patent Literature 2 discloses an actuator capable of contracting in the axial direction thereof. In addition, Patent Literature 1 discloses an example in which a plurality of coiled polymer fibers are arranged to provide an arbitrary generated force.

CITATION LIST

Patent Literature

Patent Literature 1: International publication No. 2014/022667
Patent Literature 2: U.S. Pat. No. 4,733,603
Patent Literature 3: Japanese Patent Publication No. 6111438
Patent Literature 4: Japanese Patent Application Publication No. 2007-16327

Non-Patent Literature

Non-Patent Literature 1: Maki Hiraoka et al., "Large strains and their polymer chain morphologies on coiled polymer fiber actuators" Proceedings of 24th Polymer Material Forum, Vol. 24, Page 39 (Publication Date: Nov. 15, 2015)
Non-Patent Literature 2: Maki Hiraoka et al. "Power-efficient low-temperature woven coiled fibre actuator for wearable applications" Scientific Reports volume 6, Article number: 36358 (2016)

SUMMARY

The present invention provides an actuator device and an actuator band each capable of stably operating in repeated operations with suppression of an increase in a resistance value of a heating wire, and a method for manufacturing the actuator band.

The actuator device according to one aspect of the present disclosure comprises:
an actuator band; and
a control device,
wherein
the actuator band comprises a plurality of actuator wires and a plurality of heating wires;
each of the plurality of actuator wires is formed from a fiber which consists of a polymer;
the fiber is twisted around the long axis thereof;
the fiber is folded so as to have a shape of a cylindrical coil;
each of the plurality of actuator wires is contracted by heat and restored by release of the heat;
any one of a braided fabric, a woven fabric, and a knitted fabric is formed with the plurality of the actuator wires and the plurality of the heating wires;
the plurality of the actuator wires are arranged in parallel in a planar shape;
at a first end of the actuator band, a first end of each of the plurality of the heating wires is connected to a first end of each of the plurality of the actuator wires;
at a second end of the actuator band, a second end of each of the plurality of the heating wires is connected to a second end of each of the plurality of the actuator wires;
the control device is configured to supply, to each of the plurality of the heating wires, electric power for heating each of the plurality of the heating wires; and
the actuator band is contracted in a first direction from the first end to the second end of the actuator band by heating the actuator band in a state where a tension has been applied along the first direction.

The actuator band according to one aspect of the present disclosure comprises:
a plurality of actuator wires; and
a plurality of heating wires,
wherein
each of the plurality of the actuator wires is formed from a fiber which consists of a polymer;
the fiber is twisted around the long axis thereof;
the fiber is folded so as to have a shape of a cylindrical coil;
each of the plurality of the actuator wires is contracted by heat and restored by release of the heat;
any one of a braided fabric, a woven fabric, and a knitted fabric is formed with the plurality of the actuator wires and the plurality of the heating wires;
the plurality of the actuator wires are arranged in parallel in a planar shape;
a first end of each of the plurality of the heating wires is connected to a first end of each of the plurality of the actuator wires; and
a second end of each of the plurality of the heating wires is connected to a second end of each of the plurality of the actuator wires.

The method for manufacturing an actuator band according to one aspect of the present disclosure comprises:
forming any one of a braided fabric, a woven fabric, or a knitted fabric with a plurality of actuator wires each of which is contracted by heat and restored by release of the heat and a plurality of heating wires to form the actuator band,
wherein
each of the plurality of the actuator wires is formed of a fiber which consists of a polymer;
the fiber is twisted around the long axis thereof and folded so as to have a shape of a cylindrical coil; and
the plurality of the actuator wires are disposed in parallel in a planer shape.

The present invention provides an actuator device and an actuator band each capable of stably operating in repeated operations with suppression of an increase in a resistance value of a heating wire, and a method for manufacturing the actuator band.

DETAILED DESCRIPTION OF THE EMBODIMENT

Hereinafter, the embodiment of the present invention will be described with reference to the drawings.

Figure 1A:
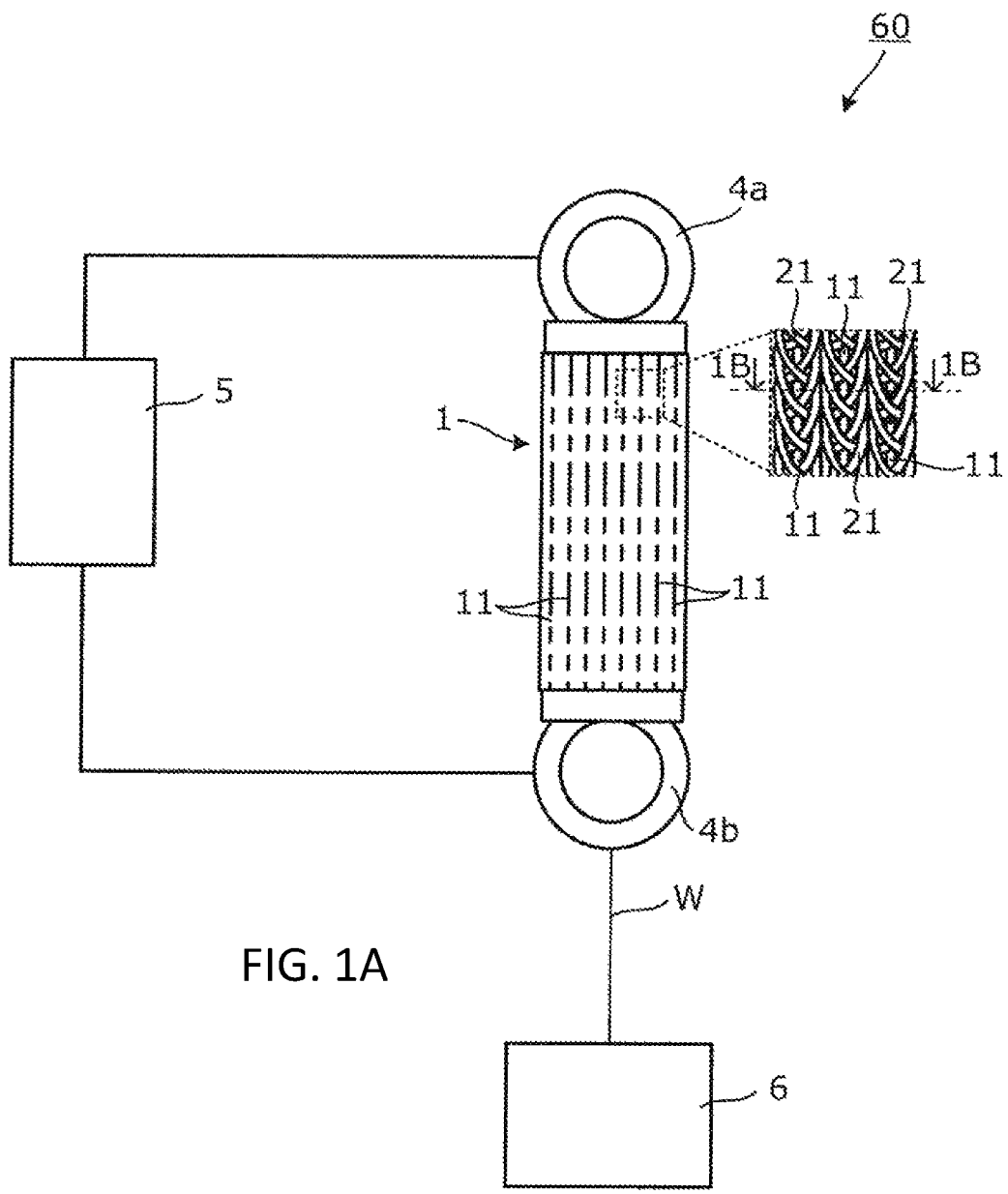
FIG. 1A is a schematic diagram showing an actuator device according to an embodiment.

FIG. 1A is a schematic diagram showing an actuator device 60 according to the embodiment. As shown in FIG. 1A, the actuator device 60 according to the embodiment comprises an actuator band 1 and a control device 5. The actuator band 1 comprises a plurality of actuator wires 11 and a plurality of heating wires 21.

[Actuator Wire]

For the details of the actuator wire 11, see Patent Literature 3, which precedes the present patent application. Patent Literature 3 (i.e., Japanese Patent Publication No. 6111438) and United States Patent Application Publication No. 2015/0245145, which corresponds to Patent Literature 3 are incorporated herein by reference. In addition, the actuator wire 11 is disclosed in Non-Patent Literature 1.

The terms "actuator wire 11" and "heating wire 21" used in the present specification correspond to the terms "fiber" and "temperature regulator" used in Patent Literature 3, respectively. As disclosed in Patent Literature 3, the actuator wire 11 may be composed of a coiled polymer fiber 111 (see FIG. 2) formed of linear low density polyethylene. The actuator wire 11 is contracted by heat and restored by the release of the heat.

As one example, when the actuator wire 11 having one end to which 10 MPa of weight has been applied is heated to 90 degrees Celsius, the actuator wire 11 is contracted by approximately 23%. When the actuator wire 11 is cooled to room temperature, the actuator wire 11 is restored to its original length. As disclosed in Patent Literature 3, the actuator wire 11 may be heated to a temperature of, for example, not less than 30 degrees Celsius and not more than 100 degrees Celsius. The material of the coiled polymer fiber 111 is not limited to linear low density polyethylene, and may be a polymer.

Other examples of the material of the coiled polymer fiber 111 include polyethylene (for example, low density polyethylene or high density polyethylene), nylon (for example, nylon 6, nylon 6,6, or nylon 12), polyester, and elastomer (for example, silicone rubber).

Figure 2:
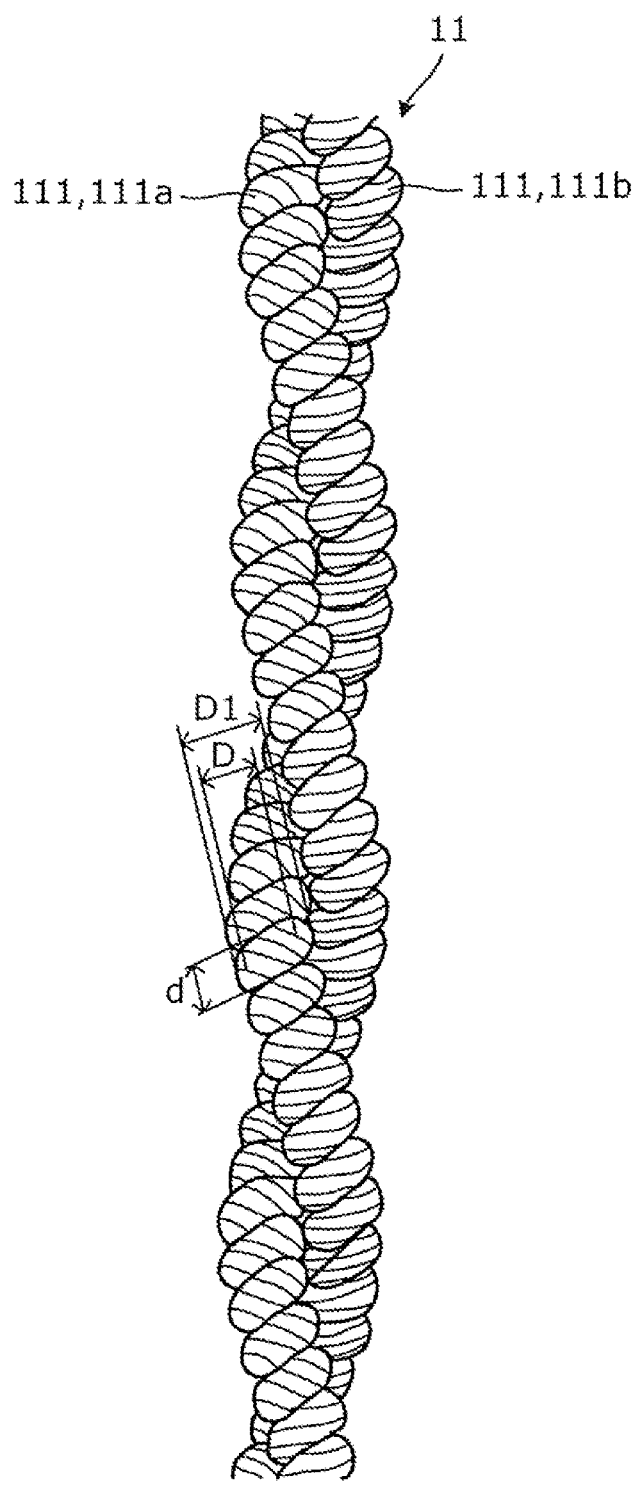
FIG. 2 is a schematic diagram showing an actuator wire according to the embodiment.

FIG. 2 is a schematic diagram showing the actuator wire 11 according to the embodiment. The actuator wire 11 may be composed of at least one coiled polymer fiber 111. For example, in FIG. 2, the actuator wire 11 is composed of two coiled polymer fibers 111 integrated so as to be twisted with each other. Specifically, the actuator wire 11 may be composed of two or more coiled polymer fibers 111 that have been twisted with each other around the long axis thereof. In other words, the actuator wire 11 may be formed by twisting the two or more coiled polymer fibers 111 in such a manner that a side surface of one twisted coiled polymer fiber 111a is brought into contact with a side surface of another twisted coiled polymer fiber 111b. As a result, each of the coiled polymer fibers 111a and 111b is folded so as to have a shape of a cylindrical coil.

Here, as described in Patent Literature 3, the coiled polymer fiber 111 satisfies the following formula (I).

$$D/d < 1 \tag{I}$$

where D represents an average diameter of the cylindrical coil of the coiled polymer fiber 111, and d represents a diameter of the coiled polymer fiber 111. Due to this relationship, a displacement rate of the actuator wire 11 can be increased. The average diameter D is provided by subtracting the diameter d of the coiled polymer fiber 111 from an outer diameter D1 of the cylindrical coil.

[Heating Wire]

Figure 3:
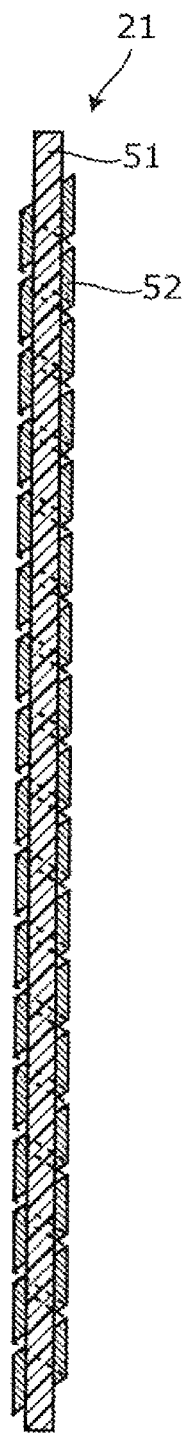
FIG. 3 is a cross-sectional view showing a heating wire according to the embodiment.

FIG. 3 is a cross-sectional view showing the heating wire 21 according to the embodiment. As shown in FIG. 3, the heating wire 21 comprises a non-conductive elastic yarn 51 which serves as a core yarn, and a metal wire 52 which covers the circumference of the elastic yarn 51. Specifically, the heating wire 21 is manufactured by a known covering processing machine using the elastic yarn 51 as the core yarn and the metal wire 52 as a sheath yarn. Here, the covering means that the metal wire 52 is wound around the elastic yarn 51 in an S direction or a Z direction. In the present embodiment, the heating wire 21 in which one line of the metal wire 52 has been wound around the elastic yarn 51 is referred to as a single covering heating wire. Note that the metal wire 52 alone may be used as the heating wire 21.

[Actuator Band]

As shown in FIG. 1A, the actuator band 1 comprises a plurality of the heating wires 21 and a plurality of the actuator wires 11. Each of the heating wires 21 forms braided stitches by flat braiding. The actuator wire 11 is arranged between the braided stitches. This arrangement is generally referred to as cord rubber or rubber cord. See Patent Literature 4 for details of the configuration of the rubber cord. The plurality of the heating wires 21 intersect each other to form the braided stitches. The braided stitches change to be expanded and contracted. On the other hand, each of the actuator wires 11 is arranged linearly in the braided stitches formed by the heating wires 21. Each of the actuator wires 11 is arranged in parallel to each other. In this way, in the actuator band 1, a braided fabric is formed by the plurality of the actuator wires 11 and the plurality of the heating wires 21 arranged in parallel in a planar shape. Since the actuator band 1 has such a structure, each of the actuator wires 11 is contracted, when heated by the heating wires 21 which are heat sources.

FIG. 1A shows a case where eight actuator wires 11 (two-dot chain lines in FIG. 1A) which form one actuator band 1 are arranged in parallel. In this example, seventeen heating wires 21 which form the one actuator band 1 are used.

Figure 1B:
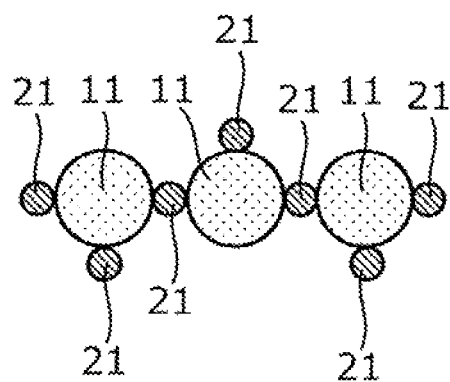
FIG. 1B is a cross-sectional view showing an actuator band according to the embodiment.

FIG. 1B is a cross-sectional view showing the actuator band 1 according to the embodiment. Specifically, FIG. 1B is a cross-sectional view taken along the line 1B-1B shown in FIG. 1A. In FIG. 1B, for convenience, each of the one actuator wires 11 is illustrated by one circle.

As shown in FIG. 1B, three heating wires 21 are arranged substantially evenly around each of the actuator wires 11. For this reason, contacts between the heating wires 21 are less likely to be concentrated, and a local increase in resistance can be prevented.

In addition, the heating wire 21 between the two actuator wires 11 is used in common by these two actuator wires 11. For this reason, the number of the heating wires 21 can be decreased and the actuator wires 11 can be heated efficiently, as compared to a case where three heating wires 21 are provided for each of the actuator wires 11.

As shown in FIG. 1A, a first connector 4a is provided at a first end of the actuator band 1. The first end of the actuator band 1 is swaged by the first connector 4a. Due to the swage, a first end of each of the plurality of heating wires 21 is connected to a first end of each of the plurality of actuator wires 11. At a second end of the actuator band 1, a second connector 4b is provided. The second end of the actuator band 1 is swaged by the second connector 4b. Due to the swage, a second end of each of the plurality of heating wires 21 is connected to a second end of each of the plurality of the actuator wires 11. The first connector 4a and the second connector 4b are electrically connected to the control device 5 via electric wires. The first connector 4a and the second connector 4b are, for example, crimp terminals. Examples of the crimp terminal include a fork crimp terminal and a ring crimp terminal. It is desirable that the crimp terminal is formed of a metal, since the heat from the heating wires 21 can be released through the first connector 4a and the second connector 4b.

[Control Device]

The control device 5 supplies electric power to the plurality of the heating wires 21 to heat each of the heating wires 21. The control device 5 may comprise a power source for supplying the electric power to the plurality of the heating wires 21. The electric power supplied to the plurality of the heating wires 21 is alternating current power or direct current power. The control device 5 may further comprise a switch. While the switch is on, electric power is supplied to the plurality of the heating wires 21. While the switch is off, electric power is not supplied to the plurality of the heating wires 21.

[Method for Manufacturing Actuator Band]

Next, a method for manufacturing the actuator band 1 will be described.

First, the plurality of the actuator wires 11 and the plurality of the heating wires 21 are set into a known flat braider. At this time, the plurality of the heating wires 21 are wound, under sufficient tension, around a plurality of bobbins provided in the flat braider. In a forming step, the flat braider operates to braid the plurality of the heating wires 21 around the plurality of the actuator wires 11. In this way, the actuator band 1 is formed.

At this time, the actuator wire 11 is arranged between the bobbins in a state where a sufficient tension is applied to the actuator wire 11 for the purpose of forming a configuration of a cord rubber. For this reason, each of the actuator wires 11 and each of the heating wires 21 are wound up, while each of the actuator wires 11 and each of the heating wires 21 are braided by the flat braider. In this way, the actuator band 1 is formed.

In general, in the tubular braiding, a plurality of wires are braided in a cylindrical shape using an even number of bobbins, whereas, in the flat braiding, a plurality of wires are braided in a belt shape using an odd number of bobbins. In the tubular braiding, the even number of bobbins may include empty bobbins. In the flat braiding, the odd number of bobbins may include empty bobbins. By adding empty bobbins, the number of the actuator wires 11 can be selected in accordance with an amount of the work required for the actuator device 60. It is also possible to braid a plurality of wires using a bobbin around which a dummy wire has been wound in place of an empty bobbin. In this case, it is possible to form balanced braided stitches, namely, uniform braided stitches. The dummy wire should be as thin as possible. As the dummy wire is thinner, loss of the amount of the work of the actuator band 1 generated due to the dummy wire can be decreased.

Subsequently, the actuator band 1 is cut to a desired length. In the present embodiment, the actuator band 1 is cut in such a way that the length along a first direction from the first end of the actuator band 1 to the second end is longer than the length (width) in the second direction perpendicular to the first direction. In other words, the first direction is a longitudinal direction of the actuator band 1. The second direction is a short direction of the actuator band 1. In addition, the first direction is an axis direction of each of the actuator wires 11.

The first connector 4a and the second connector 4b are attached to both ends of the actuator band 1 which has been cut to the desired length. The first connector 4a and the second connector 4b are electrically connected to the control device 5 via electric wires. In this way, the actuator device 60 is provided.

[Operation of Actuator Device]

Next, the operation of the actuator device 60 will be described. As shown in FIG. 1A, a weight 6 is connected to the second connector 4b, which has been attached to the first end of the actuator band 1, via an electric wire W. Due to the weight 6, the actuator band 1 is provided with a predetermined tension and is turned into a tensioned state. In other words, a tension along the first direction has been applied to the actuator band 1 with the weight 6.

Figure 4A:
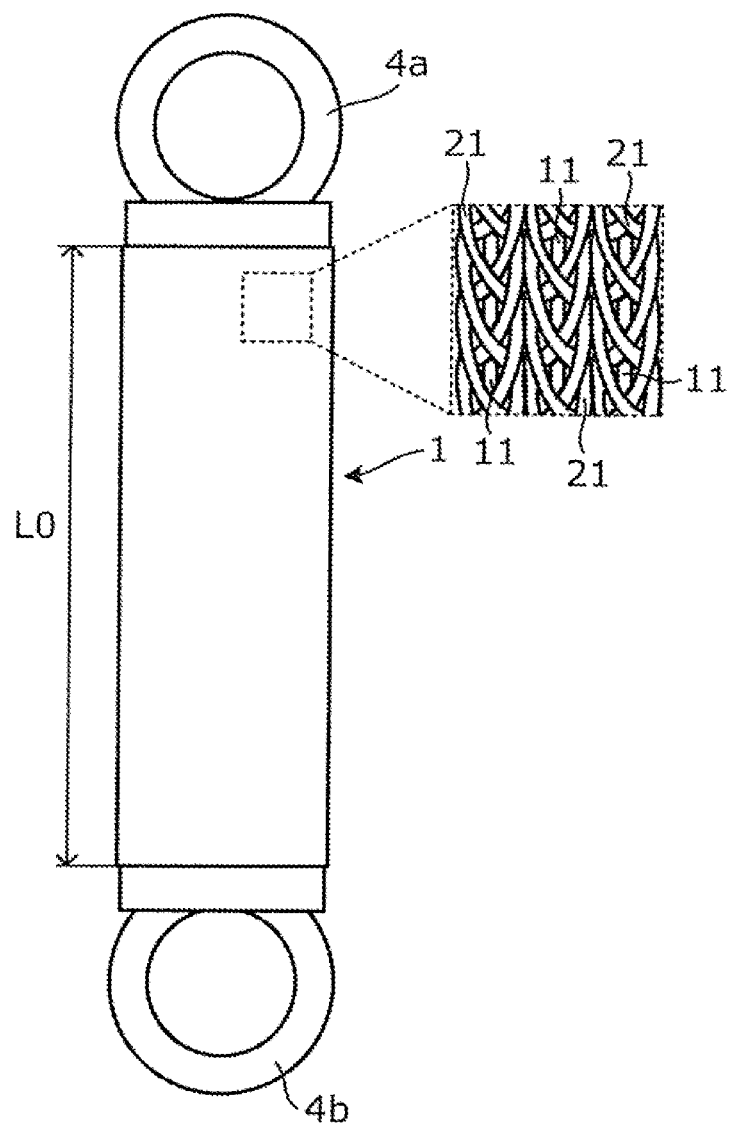
FIG. 4A is a schematic diagram showing a state where no heat is applied to the heating wire in the actuator band according to the embodiment.
Figure 4B:
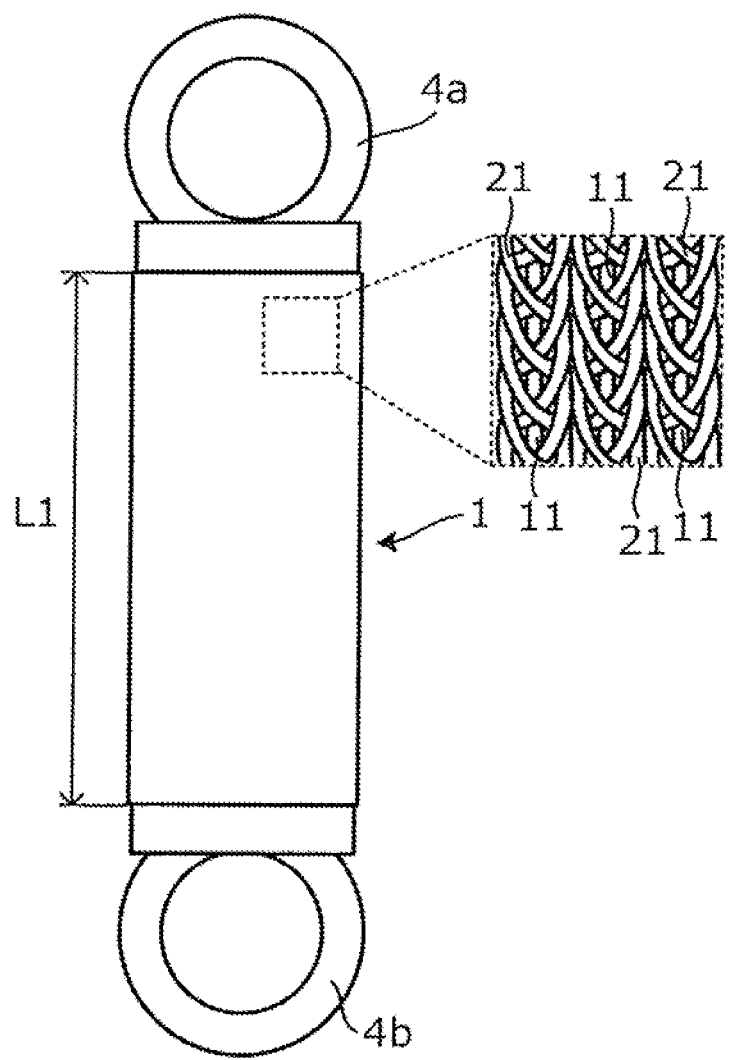
FIG. 4B is a schematic diagram showing a state where heat is applied to the heating wire in the actuator band according to the embodiment.

FIG. 4A is a schematic diagram showing a state where the heating wire 21 is not heated in the actuator band 1 according to the embodiment. FIG. 4B is a schematic diagram showing a state where the heating wire 21 is heated in the actuator band 1 according to the embodiment.

As shown in FIG. 4A, initial tension is applied to the actuator band 1 in the state where the heating wire 21 is not heated. As a result, the braided stitches formed by the plurality of the heating wires 21 expand along the first direction. The length in the first direction of the actuator band 1 at this time is defined by L0.

As shown in FIG. 4B, in the state where the heating wire 21 is heated, the plurality of the actuator wires 11 of the actuator band 1 are contracted by the heat. In conjunction with the contraction, the braided stitches formed by the plurality of the heating wires 21 are deformed and contracted in the first direction. As a result, the length L1 of the actuator band 1 in the first direction is shorter than the length L0.

As just described, the actuator band 1 are expanded and contracted due to the deformation of the braided stitches formed by the plurality of the heating wires 21, due to the contraction due to the heating of the actuator wire 11, and due to the restoration due to the release of the heat. For this reason, the expansion/contraction movement of the actuator wire 11 is not hindered at the point where the heating wires 21 intersect each other. Here, in order for each of the heating wires 21 to uniformly deform in conjunction with the expansion and contraction of the actuator wire 11, it is desirable that each of the heating wires 21 has elasticity and low rigidity.

In addition, it is desirable that the initial tension applied to the actuator band 1 is as small as possible, and that the contraction ratio of the actuator band 1 is as large as possible. It is desirable to configure the actuator band 1 so as to stabilize the expansion and contraction operation generated due to the repetition of heating and release of the heat.

EXAMPLES

Examples according to the present invention will be described below.

(Manufacture of Actuator Wire 11)

In accordance with the disclosure of Patent Literature 3, the present inventors provided coiled polymer fibers 111. Next, the present inventors twisted two coiled polymer fibers 111 to provide an actuator wire 11 (see FIG. 2). In this way, the actuator wire 11 was composed of the two coiled polymer fibers 111 which had been twisted with each other. In other words, a side surface of one twisted coiled polymer fiber 111a was in contact with a side surface of another twisted coiled polymer fiber 111b.

(Manufacture of Heating Wires 21)

A monofilament formed of polyester (manufactured by Toray Industries, Inc., fiber diameter: 10 denier) was used as an elastic yarn 51. A stainless wire (Nippon Seisen Co., Ltd., trade name: stainless steel wire, material: SUS 316L, diameter size: 0.030 mm) was used as a metal wire 52 (sheath yarn). The metal wire 52 was braided around the elastic yarn 51 in S-twist (the number of the twist: 2,950 T/m). In this way, the present inventors provided the heating wires 21.

(Manufacture of Actuator Band 1)

An actuator band 1 having a structure of cord rubber (or rubber cord) was manufactured. Eight actuator wires 11 and seventeen heating wires 21 were used. The eight actuator wires 11 and the seventeen heating wires 21 were braided, using a flat braider, so as to arrange the eight actuator wires 11 and to draw loops having a shape in which the characters of the numeric character "8" are successionally connected vertically using the seventeen heating wires 21 in such a way that the eight actuator wires 11 and the loops are parallel to each other. In this way, an actuator band 1 was provided. The length of the actuator band 1 in the first direction was approximately 60 mm. In addition, a first connector 4a was attached to the first end of the actuator band 1, and a second connector 4b was attached to the second end of the actuator band 1.

(Heating Test)

Figure 5:
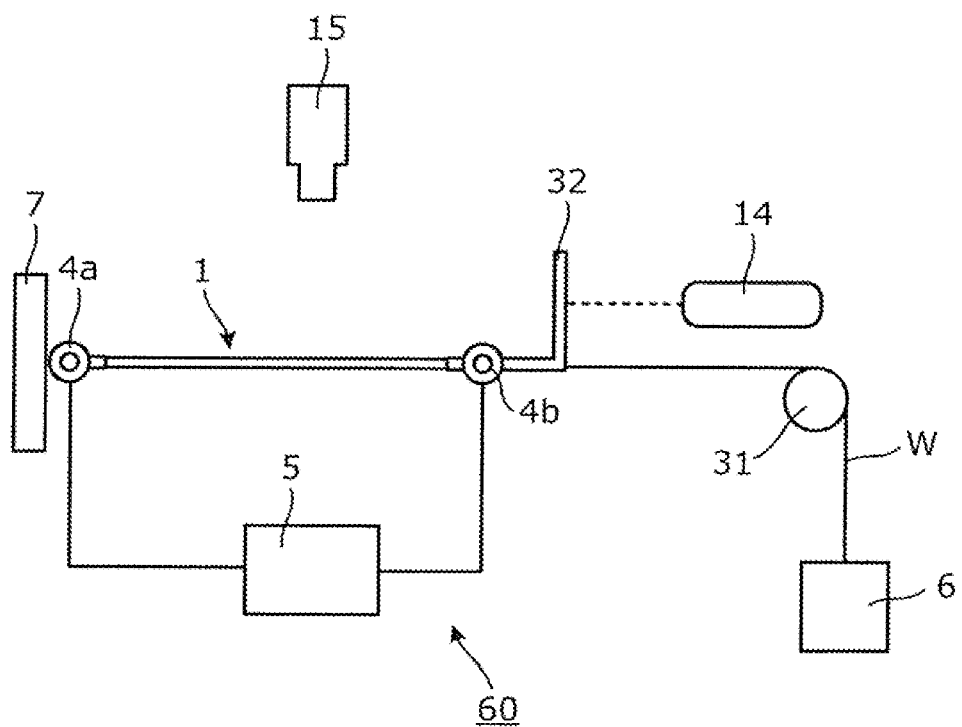
FIG. 5 is a schematic diagram of a testing device which is used for a heating test.

Next, the heating test for the actuator band 1 will be described. FIG. 5 is a schematic diagram of a test device 100 which is used for the heating test. As shown in FIG. 5, the test device 100 comprises a fixing plate 7, a pulley 31, a mirror 32, a radiation thermometer 15, and a laser displacement meter 14.

The first connector 4a was fixed using the fixing plate 7. The pulley 31 is a pulley that guides the electric wire W attached to the second connector 4b on the second end of the actuator band 1. The actuator band 1 is arranged substantially horizontally with the fixing plate 7 and the pulley 31. For example, a weight 6 of 500 g is attached to the electric wire W. Due to the initial tension by the weight 6, the actuator band 1 is turned into an expanded state (see, for example, FIG. 4A). The second connector 4b of the actuator band 1 is movable along the first direction in conjunction with the expansion and contraction of the actuator band 1.

The mirror 32 is attached to the second connector 4b of the actuator band 1, and configured to move in the first direction in conjunction with the movement of the second connector 4b. The mirror surface of the mirror 32 was provided along a direction perpendicular to the first direction, and the laser displacement meter 14 (purchased from Keyence Corporation, trade name "LK-080") was disposed at a position facing the mirror surface of the mirror 32. The laser displacement meter 14 measures the displacement of the second connector 4b by irradiating the mirror 32 with laser light and detecting the laser light reflected by the mirror 32. In other words, the laser displacement meter 14 measures the displacement of the actuator band 1.

The radiation thermometer 15 is disposed at a position where infrared or visible light emitted from the actuator band 1 can be detected, and measures the temperature of the actuator band 1 based on the detected infrared or visible light. In the examples, the radiation thermometer 15 (product of Apiste, trade name "FSV-210") was used.

The present inventors used the control device 5 to supply electric power of 1.8 W having electric current of 380 mA to the heating wires 21 for 12 seconds. In this way, the actuator band 1 was heated. At this time, the temperature of the side surface of the actuator band 1 reached approximately 70 degrees Celsius. Due to the heating, the actuator band 1 was contracted in the first direction.

Subsequently, for a cooling time of 120 seconds, no electric current was supplied to the heating wires 21. In this way, the actuator band 1 was naturally cooled, until the temperature of the side surface of the actuator band 1 reached not more than 30 degrees Celsius. Due to the release of the heat, the actuator band 1 was expanded and restored in the first direction. As the actuator band 1 was contracted and restored, the mirror 32 was moved in an oscillation way in the first direction. The movement was measured using the laser displacement meter 14 to measure the expansion and contraction of the actuator band 1.

Figure 6:
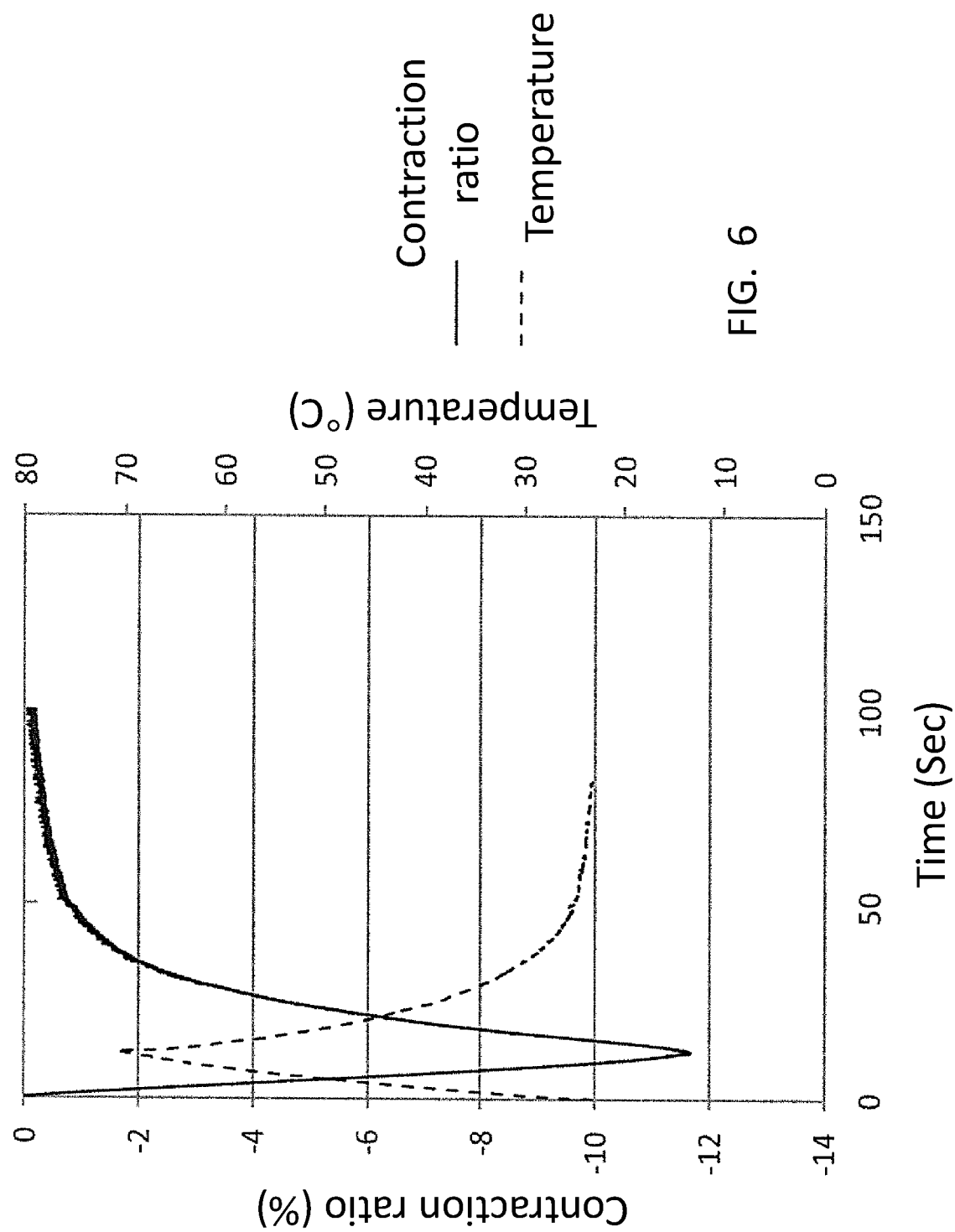
FIG. 6 is a graph showing temporal changes in a contraction ratio and temperature of the actuator band according to the inventive example.

FIG. 6 is a graph showing the temporal change in the contraction ratio and the temperature of the actuator band 1 according to the inventive example. Here, the contraction ratio C is defined by the following mathematical formula (II).

$$C=(L1-L0)/L0\times 100 \qquad (II)$$

L0 represents the length of the actuator band 1 to which the initial tension has been applied before heating (see FIG. 4A). L1 represents the length of the actuator band 1 during heating (see FIG. 4B). As shown in FIG. 6, it can be seen that, if the temperature of the actuator band 1 is increased, the contraction ratio of the actuator band 1 is decreased, and that if the temperature of the actuator band 1 is decreased, the contraction ratio of the actuator band 1 is increased.

Next, a durability test in which the actuator band 1 was heated and cooled repeatedly was performed. In the durability test, the weight 6 had a weight of 500 g, and electric current was applied to the heating wire 21 at 330 mA for 25 seconds. When the temperature of the side surface of the actuator band 1 reached approximately 70 degrees Celsius, the actuator band 1 was cooled with a cooling fan for 25 seconds. Cooling was accelerated with the fan, so that the temperature of the side surface of the actuator band 1 reached not more than 30 degrees Celsius. The heating and cooling was repeated 14,500 times.

Figure 7A:
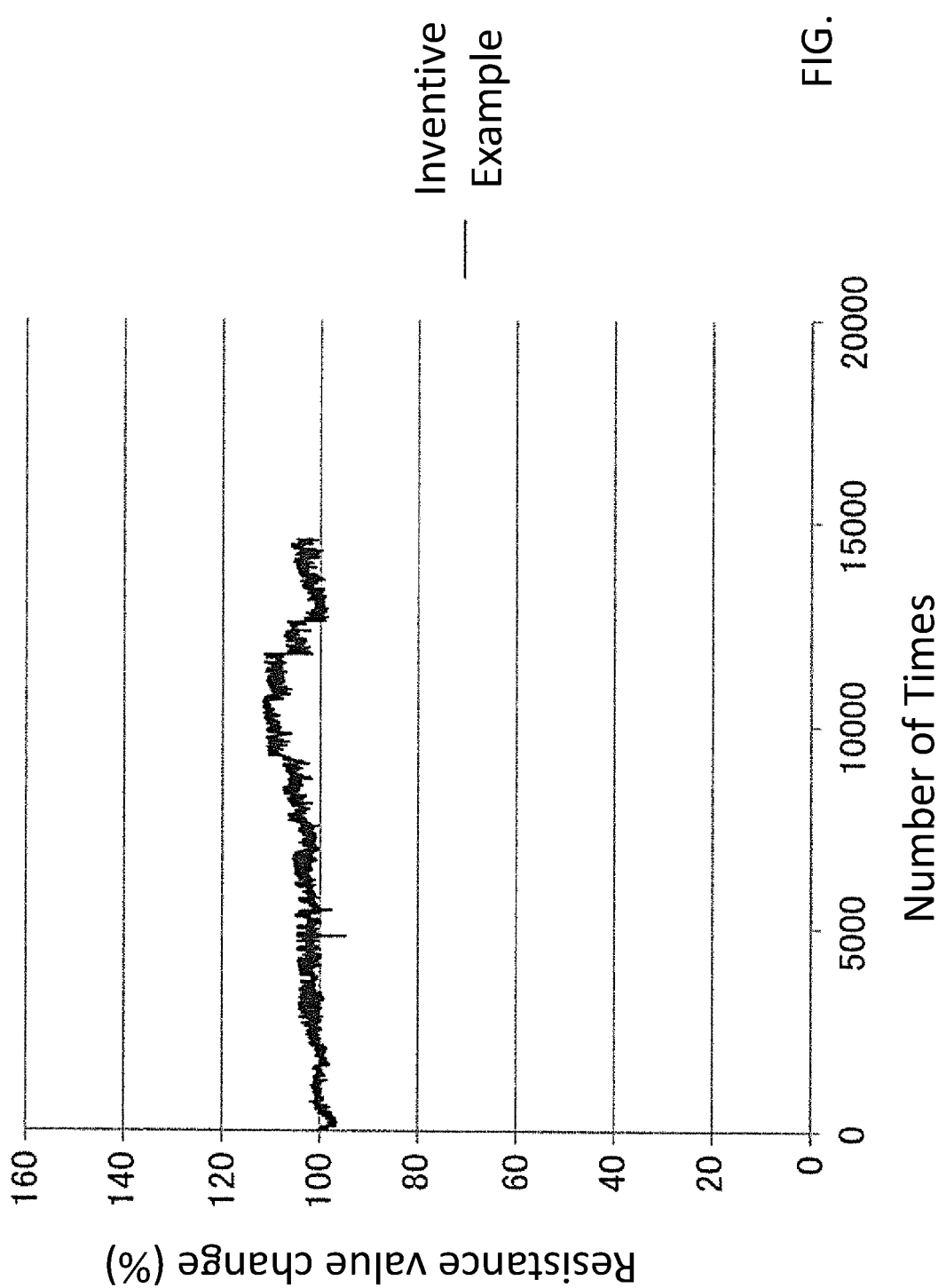
FIG. 7A is a graph showing a relationship between a resistance value change and a repeat count of the actuator band according to the inventive example.

FIG. 7A is a graph showing a relationship between a resistance value change and a repeat count of the actuator band 1 according to the inventive example.

As shown in FIG. 7A, it can be seen that, in the actuator band 1 according to the inventive example, the resistance value change was not more than 120%.

Comparative Example

Figure 8A:
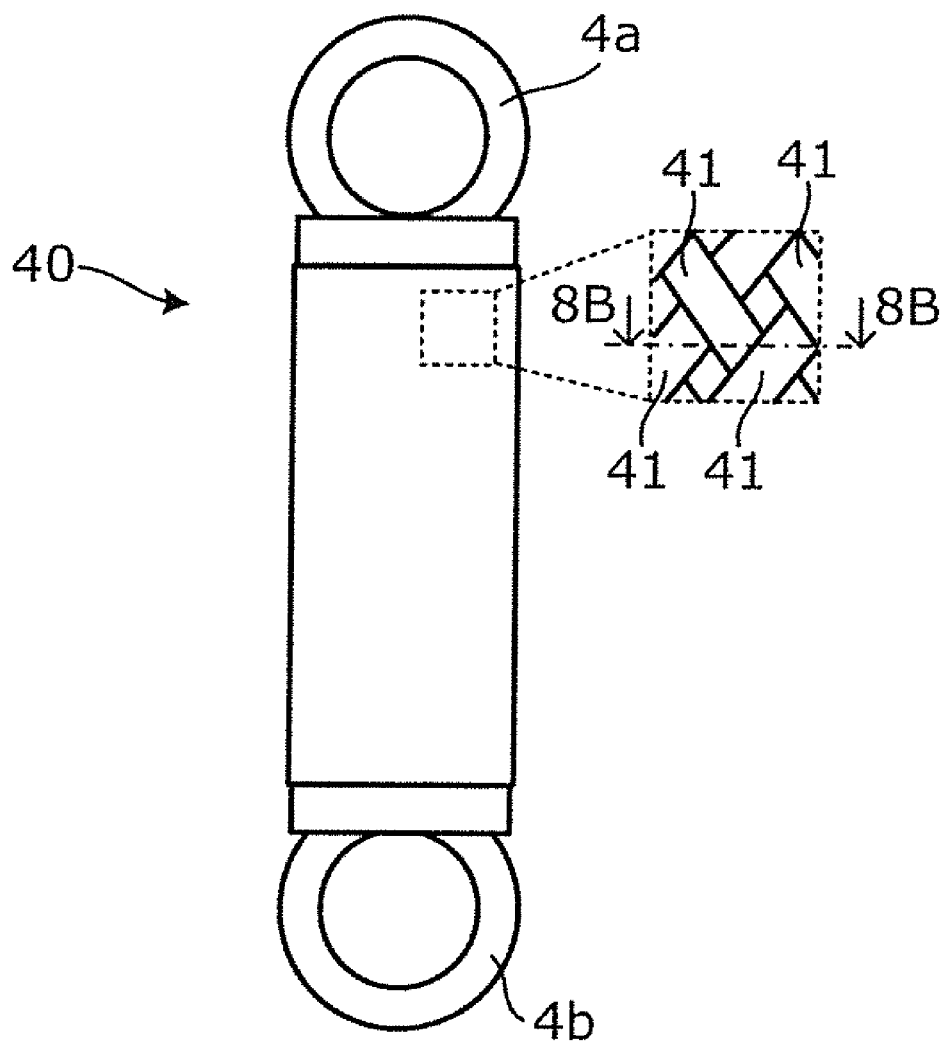
FIG. 8A is a schematic diagram showing an actuator band according to the comparative example.
Figure 8B:
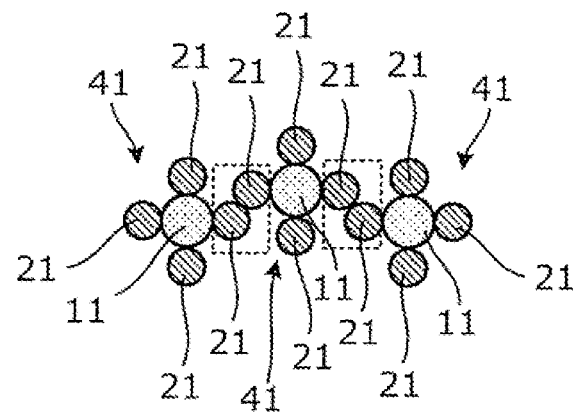
FIG. 8B is a cross-sectional view showing the actuator band according to the comparative example.
Figure 9:
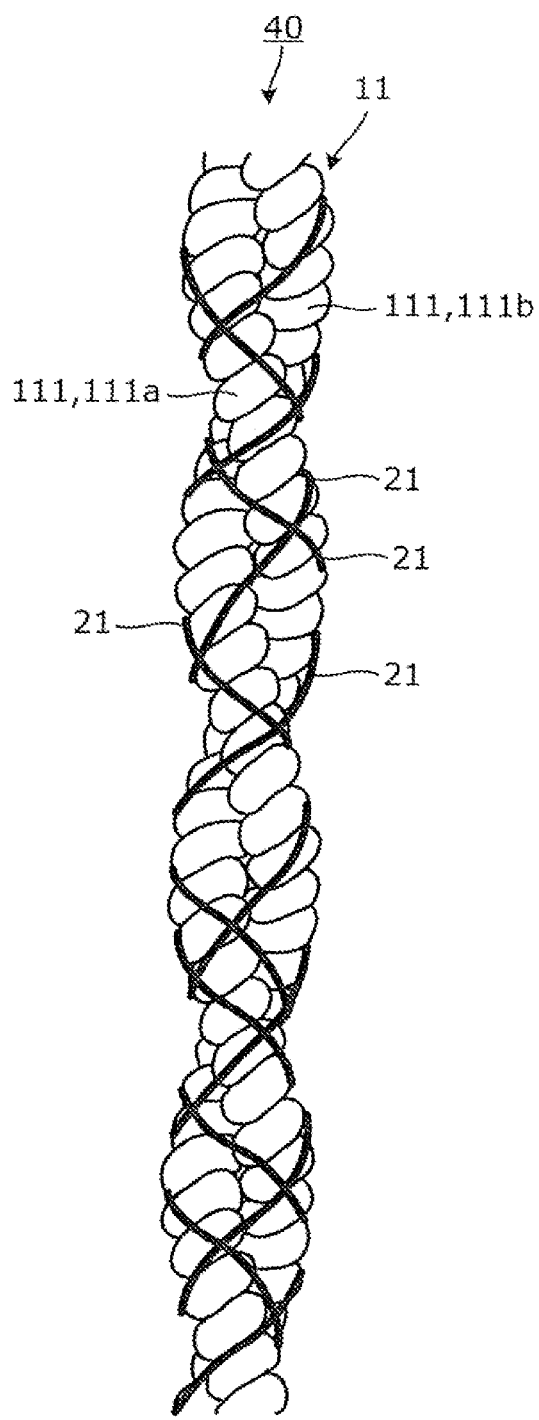
FIG. 9 is a front view showing an actuator single wire which forms the actuator band according to the comparative example.

Next, an actuator band 40 according to the comparative example will be described. FIG. 8A is a schematic diagram showing the actuator band 40 according to the comparative example. FIG. 9 is a front view showing an actuator single wire 41 provided in the actuator band 40 according to the comparative example. FIG. 8B is a cross-sectional view showing the actuator band 40 according to the comparative example. Specifically, FIG. 8B is a cross-sectional view taken along the line 8B-8B shown in FIG. 8A. For convenience, in FIG. 8B, one actuator wire 11 is illustrated by one circle. In the following description, the same parts as those in the above embodiment may be denoted by the same reference signs and description thereof may be omitted.

As shown in FIG. 8A, the actuator band 40 is formed by braiding a plurality of the actuator single wires 41. As shown in FIG. 8A, the actuator single wire 41 is formed by arranging four heating wires 21 braided in a mesh pattern around the actuator wire 11. Specifically, the actuator single wire 41 is formed by covering the four heating wires 21 in a mesh shape around the actuator wire 11 by a process which is referred to as tubular braiding.

The actuator band 40 is formed by braiding nine actuator single wires 41 by a process which is referred to as flat braiding. Since the actuator band 40 has the nine actuator single wires 41, the actuator band 40 is provided with thirty-six heating wires 21 as a whole. In addition, the length of the actuator band 40 in the first direction is approximately 70 mm. The first connector 4a has been attached to a first end of the actuator band 40, and the second connector 4b has been attached to a second end of the actuator band 40.

As shown in FIG. 8B, in the actuator band 40, the four heating wires 21 are arranged substantially evenly around each of the actuator wires 11. As a result, in a part surrounded by the broken line in FIG. 8B, an arrangement density of the heating wires 21 is larger than that of the inventive example.

The durability test in which the heating and cooling was repeated was performed on the actuator band 40 in the same manner as in the inventive example. In the durability test, the weight 6 had a weight of 500 g, and electric current to the heating wire 21 was applied at 470 mA for 30 seconds. When the temperature of the side surface of the actuator band 40 reached approximately 70 degrees Celsius, the actuator band 40 was cooled with a cooling fan for 25 seconds. Cooling was accelerated with the fan, so that the temperature of the side surface of the actuator band 40 reached not more than 30 degrees Celsius. The heating and cooling was repeated 14,500 times.

Figure 7B:
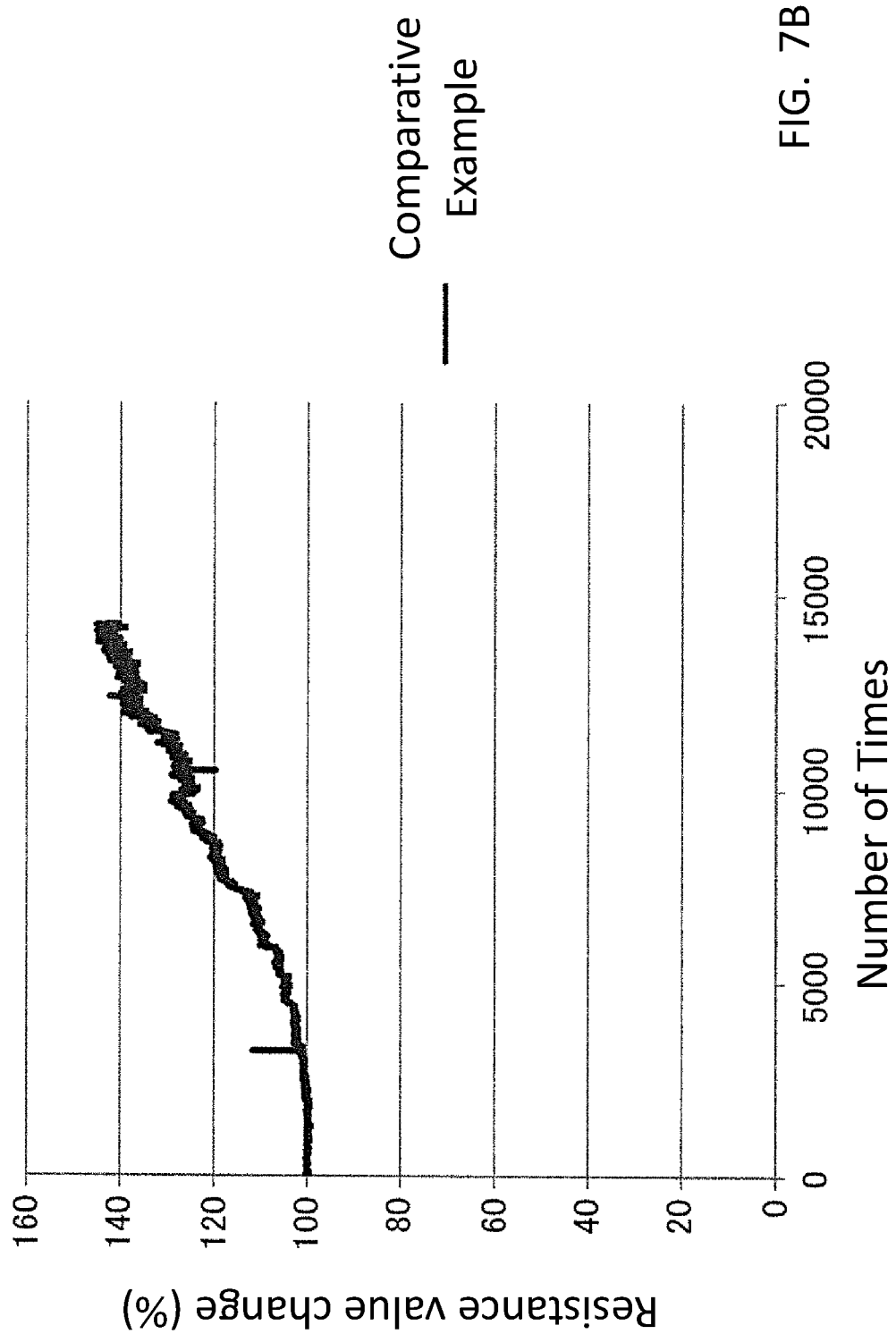
FIG. 7B is a graph showing a relationship between a resistance value change and a repeat count of the actuator band according to the comparative example.

FIG. 7B is a graph showing a relationship between a resistance value change and a repeat count of the actuator band 40 according to the comparative example. As shown in FIG. 7B, it can be seen that, in the actuator band 40 according to the comparative example, the resistance value change exceeded 140%.

As just described, it can be seen that the resistance value change is suppressed in the actuator band 1 according to the inventive example more than in the actuator band 40 according to the comparative example.

Next, variations of the actuator band 1 according to the present invention will be described. In the following description, the same parts as those in the above embodiment may be denoted by the same reference numerals and the description thereof may be omitted.

[First Variation]

Figure 10:
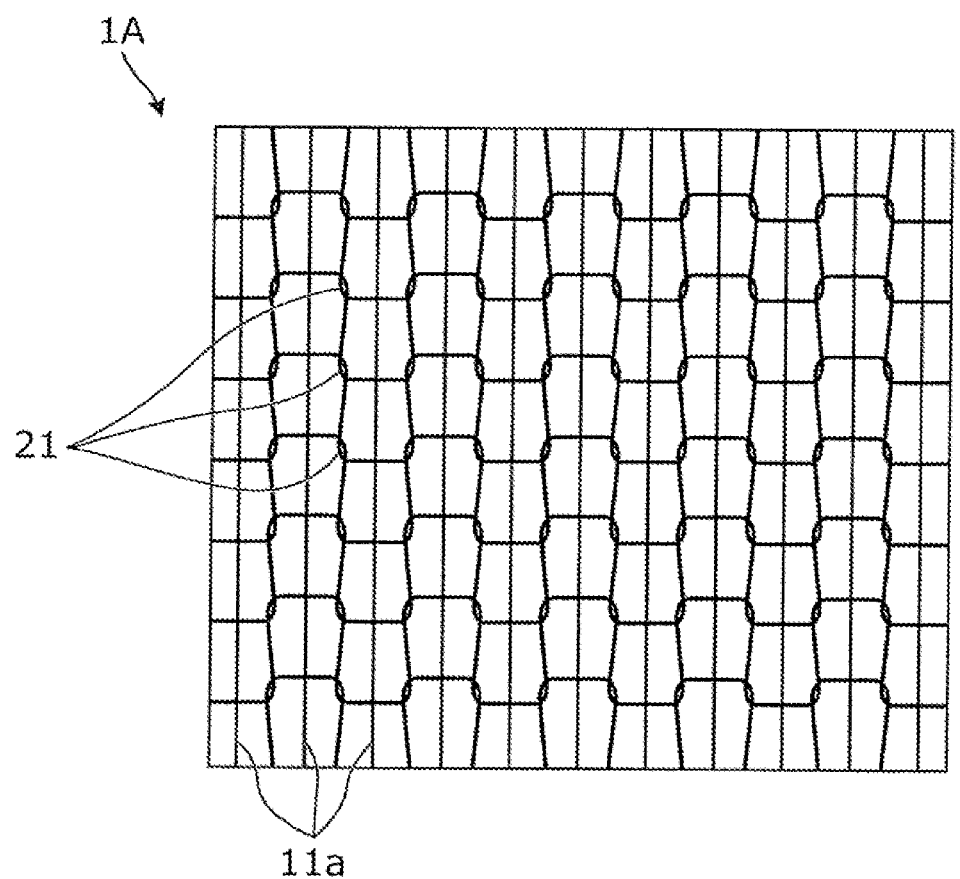
FIG. 10 is a schematic diagram showing an actuator band according to a first variation.

FIG. 10 is a schematic diagram showing an actuator band 1A according to the first variation. As shown in FIG. 10, each of the heating wires 21 has a rectangular wave shape, and the plurality of the heating wires 21 are knitted so as to have a shape of a mesh. A plurality of actuator wires 11a are arranged in parallel in a planar shape with respect to each of the knitted heating wires 21. Specifically, each of the actuator wires 11a is inserted in parallel to each of the heating wires 21 from the upper or lower side in FIG. 10. In this way, the actuator wires 11a are arranged in the planar shape with respect to a single knitted fabric composed of the plurality of the heating wires 21.

[Second Variation]

Figure 11:
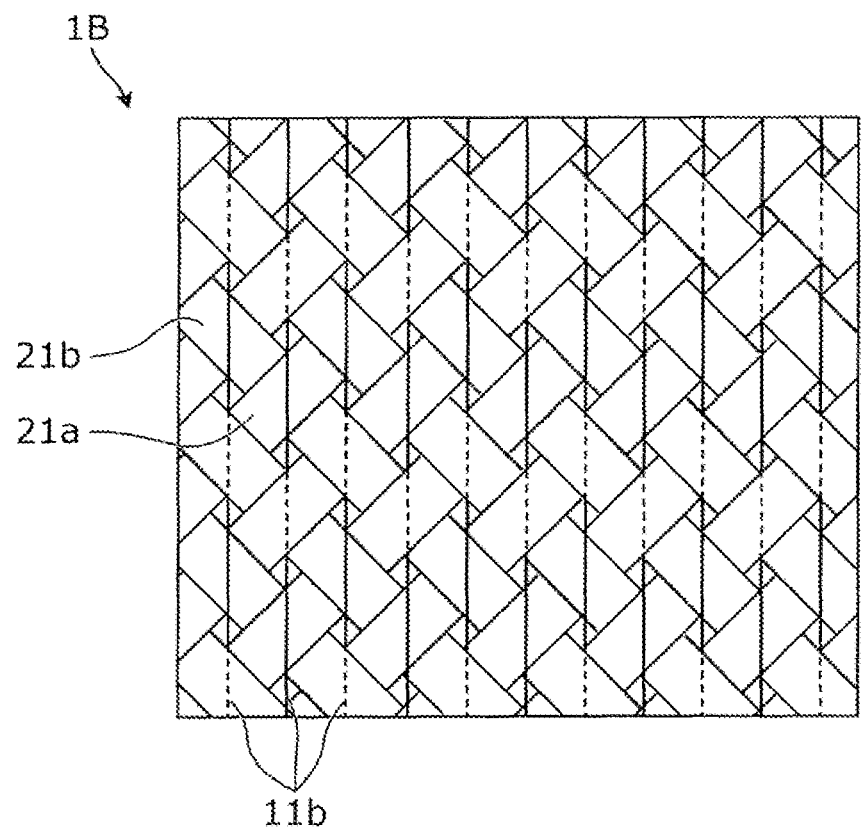
FIG. 11 is a schematic diagram showing an actuator band according to a second variation.

FIG. 11 is a schematic diagram showing an actuator band 1B according to the second variation. As shown in FIG. 11, each of the heating wires 21a and 21b has a shape of an elongate plate (namely, a shape of a belt). Each of the heating wires 21a and 21b is woven in a lattice shape. A plurality of actuator wires 11b are arranged in parallel in a planar shape with respect to the woven heating wires 21a and 21b. Specifically, each of the actuator wires 11b is inserted in parallel to each of the heating wires 21a and 21b from the upper or lower side in FIG. 11. In this way, the actuator wires 11b are arranged in a planer shape with respect to one fabric which consists of the plurality of the heating wires 21a and 21b.

[Third Variation]

Figure 12:
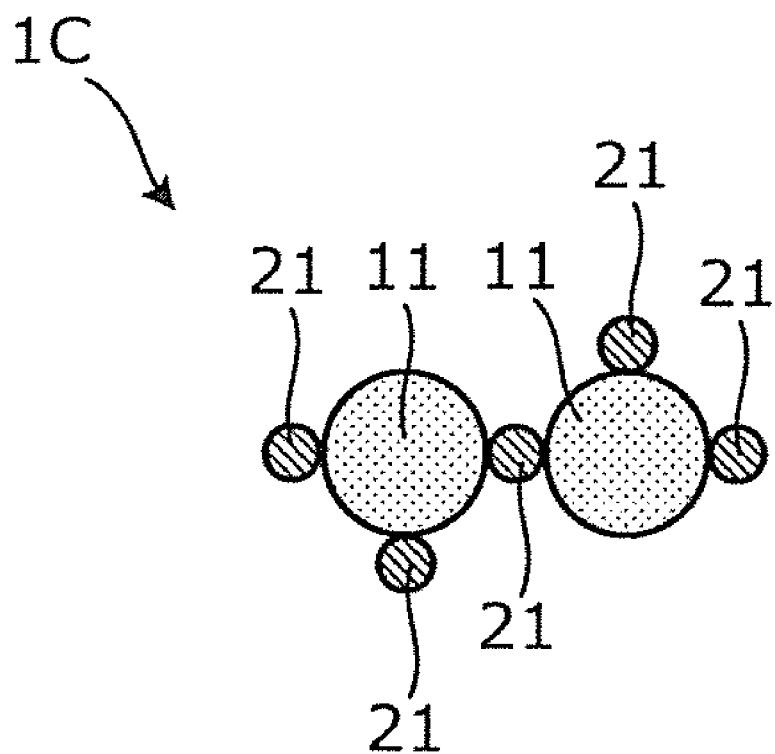
FIG. 12 is a cross-sectional view showing an actuator band according to a third variation.

FIG. 12 is a cross-sectional view showing an actuator band 1C according to the third variation. As shown in FIG. 12, the actuator band 1C according to the third variation is formed of a pair of actuator wires 11 and five heating wires 21. Specifically, the three heating wires 21 are arranged substantially evenly around each of the actuator wires 11. As a result, the contacts between the heating wires 21 are less likely to be concentrated, so that a local increase in resistance can be prevented. In addition, the heating wire 21 between the pair of the actuator wires 11 is used in common by the pair of the actuator wires 11. For this reason, the number of the heating wires 21 can be decreased and the actuator wires 11 can be heated more efficiently, as compared to a case where three heating wires 21 are provided for each of the actuator wires 11.

INDUSTRIAL APPLICABILITY

The present invention is applicable to an actuator device used as an artificial muscle.

Configuration and Effect of the Present Invention

As above, the actuator device 60 according to the embodiment comprises:

an actuator band 1; and a control device 5, wherein the actuator band 1 comprises a plurality of actuator wires 11 and a plurality of heating wires 21;

each of the plurality of the actuator wires 11 is formed from a fiber which consists of a polymer (i.e. polymer fiber having a shape of a coil);

the fiber is twisted around the long axis thereof;

the fiber is folded so as to have a shape of a cylindrical coil;

each of the plurality of the actuator wires 11 is contracted by heat and restored by release of the heat;

any one of a braided fabric, a woven fabric, and a knitted fabric is formed with the plurality of the actuator wires 11 and the plurality of the heating wires 21;

the plurality of the actuator wires 11 are arranged in parallel in a planar shape;

at a first end of the actuator band 1, a first end of each of the plurality of the heating wires 21 is connected to a first end of each of the plurality of the actuator wires 11;

at a second end of the actuator band 1, a second end of each of the plurality of the heating wires 21 is connected to a second end of each of the plurality of the actuator wires 11;

the control device 5 is configured to supply, to each of the plurality of the heating wires 21, electric power for heating each of the plurality of the heating wires 21; and the actuator band 1 is contracted in a first direction from the first end to the second end of the actuator band 1 by heating the actuator band 1 in a state where a tension has been applied along the first direction.

In addition, the actuator band 1 according to the embodiment comprises:

a plurality of actuator wires 11; and a plurality of heating wires 21, wherein each of the plurality of the actuator wires 11 is formed from a fiber which consists of a polymer (i.e. polymer fiber having a shape of a coil);

the fiber is twisted around the long axis thereof;

the fiber is folded so as to have a shape of a cylindrical coil;

each of the plurality of the actuator wires 11 is contracted by heat and restored by release of the heat;

any one of a braided fabric, a woven fabric, and a knitted fabric is formed with the plurality of the actuator wires 11 and the plurality of the heating wires 21;

the plurality of the actuator wires 11 are arranged in parallel in a planar shape;

a first end of each of the plurality of the heating wires 21 is connected to a first end of each of the plurality of the actuator wires 11; and a second end of each of the plurality of the heating wires 21 is connected to a second end of each of the plurality of the actuator wires 11.

In addition, a method for manufacturing an actuator band 1 according to the embodiment comprises:

forming any one of a braided fabric, a woven fabric, or a knitted fabric with a plurality of actuator wires 11 each of which is contracted by heat and restored by release of the heat and a plurality of heating wires 21 to form the actuator band 1, wherein each of the plurality of the actuator wires 11 is formed of a fiber which consists of a polymer (i.e. polymer fiber having a shape of a coil);

the fiber is twisted around the long axis thereof and folded so as to have a shape of a cylindrical coil; and the plurality of the actuator wires 11 are disposed in parallel in a planer shape.

In this case, since the actuator band 1 comprises at least one of the braided fabric, the woven fabric, and the knitted fabric formed with the plurality of the heating wires 21 and the plurality of the actuator wires 11 arranged in a planer shape, the plurality of the heating wires 21 are allowed to be arranged substantially evenly around each of the actuator wires 11. In this way, the contacts between the heating wires 21 are less likely to be concentrated, and a local increase in resistance can be prevented. Therefore, an increase in the resistance value of the heating wires 21 can be suppressed in repeated operations, and the actuator device 60 can be operated stably.

In addition, each of the plurality of the heating wires 21 may comprise non-conductive elastic yarn 51 and a metal wire 52, and the metal wire 52 is helically wound around the elastic yarn.

In this case, since the heating wires 21 in each of which the metal wire 52 has been wound around the elastic yarn 51 are used, the close contact area between the metal wire 52 and the actuator wire 11 can be increased, and the thermal efficiency can be increased.

In addition, the actuator band may comprise:

a first connector 4a; and a second connector 4b, wherein the first end of each of the plurality of the heating wires 21 are connected to the first end of each of the plurality of the actuator wires 11 with the first connector 4a;

the second end of each of the plurality of the heating wires 21 are connected to the second end of each of the plurality of the actuator wires 11 with the second connector 4b.

In this case, the first ends of the plurality of the heating wires 21 and the plurality of the actuator wires 11 are connected with the first connector 4a, and the second ends of the plurality of the heating wires 21 and the plurality of the actuator wires 11 are connected with the second connector 4b. Therefore, these are allowed to be connected to each other with a simple configuration. In particular, if the first connector 4a and the second connector 4b are formed of a metal, the heat from the heating wires 21 can be released through the first connector 4a and the second connector 4b.

In addition, the fiber consists of linear low density polyethylene, and the following formula (I) is satisfied.

$$D/d<1 \qquad (I)$$

where D represents an average diameter of the cylindrical coil, and d represents a diameter of the fiber.

Due to this relationship, the displacement rate of the actuator wire 11 can be increased.

[Others]

As above, the actuator device, the actuator band, and the method for manufacturing the actuator band according to the present invention have been described based on the above embodiment. Note that the present invention is not limited to the above embodiment.

For example, in the above embodiment, the case where fabric in which the plurality of the heating wires are woven is a braided fabric has been described. However, the fabric in which the plurality of the heating wires are woven may be a woven fabric or a knitted fabric.

In addition, in the above embodiment, the case where the actuator band 1 is manufactured by braiding the plurality of the actuator wires 11 integrally with the plurality of the heating wires 21 has been described. However, the actuator band 1 may be formed by forming the braided fabric with the plurality of the heating wires 21 in advance, and then, inserting the plurality of the actuator wires 11 into the braided fabric. This is applicable to a case where the fabric in which the plurality of the heating wires 21 are woven is a woven fabric or a knitted fabric.

In addition, in the above embodiment, the case where the plurality of the actuator wires 11 are arranged in parallel has been described. However, as long as the plurality of the actuator wires are arranged in a planar shape, the plurality of the actuator wires may be arranged in a non-parallel way to each other or may intersect each other.

In addition, in the above embodiment, the case where the length along the first direction from the first end of the actuator band 1 to the second end thereof is longer than the length (width) of the second direction perpendicular to the first direction has been described. However, in the actuator band, the width may be greater than or equal to the length in the first direction.

In addition, the present invention includes an embodiment which can be provided by subjecting each embodiment to various variations conceived by those skilled in the art. The present invention also includes an embodiment which can be realized by arbitrarily combining the constituent elements and functions in each embodiment without departing from the scope of the present invention.

REFERENCE SIGNS LIST

1 Actuator band
4*a* First connector
4*b* Second connector
5 Control device
6 Weight
7 Fixing plate
11 Actuator wire
14 Laser displacement meter
15 Radiation thermometer
21 Heating wire
31 Pulley
32 Mirror
40 Actuator band
41 Actuator single wire
51 Elastic yarn
52 Metal wire
60 Actuator device
100 Test device
111, 111*a*, 111*b* Coiled polymer fiber
W electric wire

The invention claimed is:

1. An actuator device, comprising:
an actuator band; and
a control device, wherein:
the actuator band comprises a plurality of actuator wires and a plurality of heating wires,
each of the plurality of actuator wires is formed from a fiber which consists of a polymer,
the fiber is twisted around the long axis thereof,
the fiber is folded so as to have a shape of a cylindrical coil,
each of the plurality of actuator wires is contracted by heat and restored by release of the heat,
any one of a braided fabric, a woven fabric, and a knitted fabric is formed with the plurality of actuator wires and the plurality of heating wires,
the plurality of actuator wires are arranged in parallel in a planar shape,
at a first end of the actuator band, a first end of each of the plurality of heating wires is connected to a first end of each of the plurality of actuator wires,
at a second end of the actuator band, a second end of each of the plurality of heating wires is connected to a second end of each of the plurality of actuator wires,
the control device is configured to supply, to each of the plurality of heating wires, electric power for heating each of the plurality of heating wires,
the actuator band is contracted in a first direction from the first end to the second end of the actuator band by heating the actuator band in a state where a tension has been applied along the first direction, and
in a cross section of the actuator band along a second direction perpendicular to the first direction, each outer periphery of the plurality of actuator wires is provided with at least three of the plurality of heating wires.

2. The actuator device according to claim 1, wherein:
each of the plurality of heating wires comprises non-conductive elastic yarn and a metal wire, and
the metal wire is helically wound around the elastic yarn.

3. The actuator device according to claim 1, wherein
the fiber is formed of linear low density polyethylene, and
the following formula (I) is satisfied:

$$D/d<1 \qquad (I)$$

where
D represents an average diameter of the cylindrical coil, and
d represents a diameter of the fiber.

4. An actuator band, comprising:
a plurality of actuator wires; and
a plurality of heating wires, wherein:
each of the plurality of actuator wires is formed from a fiber which consists of a polymer,
the fiber is twisted around the long axis thereof,
the fiber is folded so as to have a shape of a cylindrical coil,
each of the plurality of actuator wires is contracted by heat and restored by release of the heat,
any one of a braided fabric, a woven fabric, and a knitted fabric is formed with the plurality of actuator wires and the plurality of heating wires,
the plurality of actuator wires are arranged in parallel in a planar shape,
a first end of each of the plurality of heating wires is connected to a first end of each of the plurality of actuator wires,
a second end of each of the plurality of heating wires is connected to a second end of each of the plurality of actuator wires, and
in a cross section of the actuator band along a second direction perpendicular to the first direction, each outer periphery of the plurality of actuator wires is provided with at least three of the plurality of heating wires.

5. The actuator band according to claim 4, wherein:
each of the plurality of heating wires comprises non-conductive elastic yarn and a metal wire, and
the metal wire is helically wound around the elastic yarn.

6. The actuator band according to claim 4, further comprising:
a first connector; and
a second connector, wherein:
the first end of each of the plurality of heating wires are connected to the first end of each of the plurality of actuator wires with the first connector, and
the second end of each of the plurality of heating wires are connected to the second end of each of the plurality of actuator wires with the second connector.

7. The actuator band according to claim 4, wherein:
the fiber is formed of linear low density polyethylene, and
the following formula (I) is satisfied:

$$D/d<1 \qquad (I)$$

where
D represents an average diameter of the shape of the cylindrical coil; and
d represents a diameter of the fiber.

8. A method for manufacturing an actuator band, the method comprising:
forming any one of a braided fabric, a woven fabric, or a knitted fabric with a plurality of actuator wires each of which is contracted by heat and restored by release of the heat and a plurality of heating wires to form the actuator band, wherein:
each of the plurality of actuator wires is formed of a fiber which consists of a polymer,
the fiber is twisted around the long axis thereof and folded so as to have a shape of a cylindrical coil,
the plurality of actuator wires are disposed in parallel in a planer shape, and
in a cross section of the actuator band along a second direction perpendicular to the first direction, each outer periphery of the plurality of actuator wires is provided with at least three of the plurality of heating wires.

9. The actuator device according to claim 1, wherein in the cross section of the actuator band along the second direction, one of the at least three of the plurality of heating wires is provided between two of the plurality of actuator wires.

10. The actuator band according to claim 4, wherein in the cross section of the actuator band along the second direction, one of the at least three of the plurality of heating wires is provided between two of the plurality of actuator wires.

11. The method according to claim 8, wherein in the cross section of the actuator band along the second direction, one of the at least three of the plurality of heating wires is provided between two of the plurality of actuator wires.

* * * * *